Dec. 2, 1969  R. D. HULL  3,481,554
SPINNING REEL
Filed Nov. 3, 1966  5 Sheets-Sheet 1
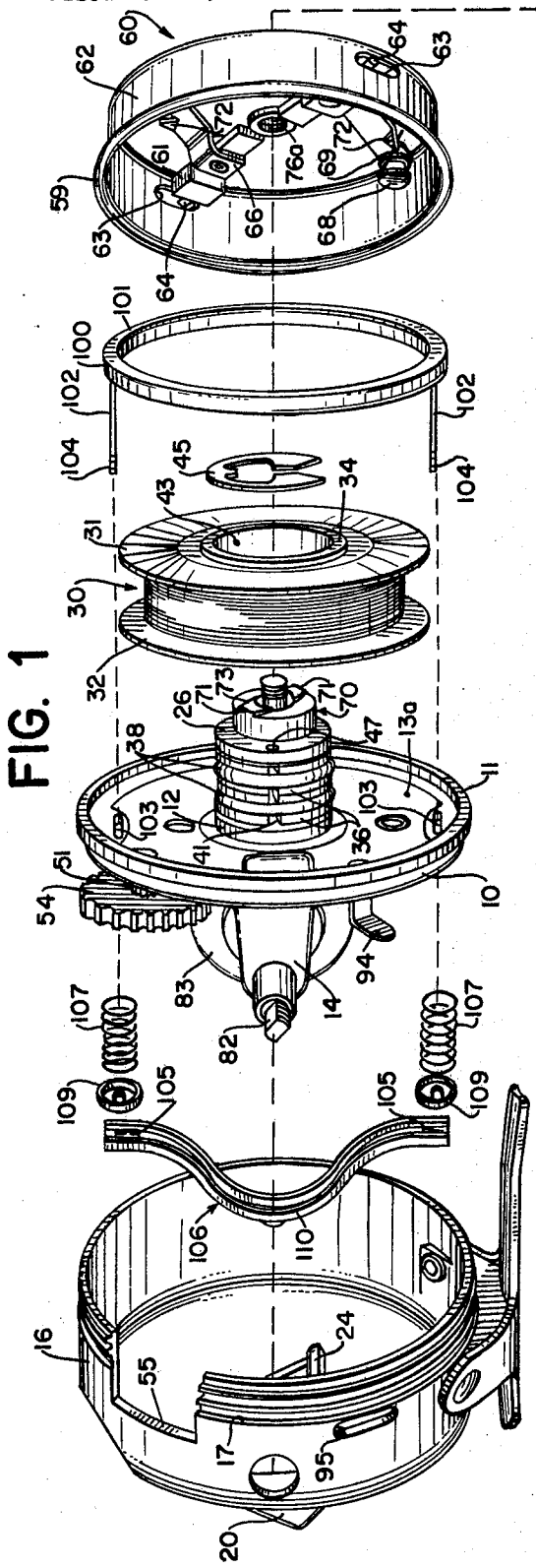
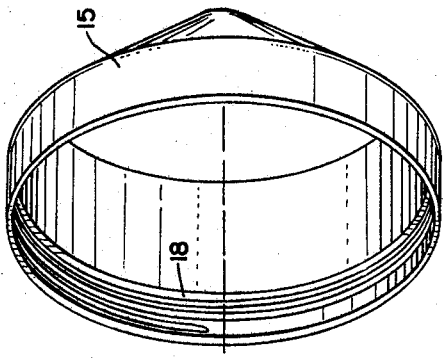
INVENTOR
R. DELL HULL
BY *Mandeville & Schweitzer*
ATTORNEYS

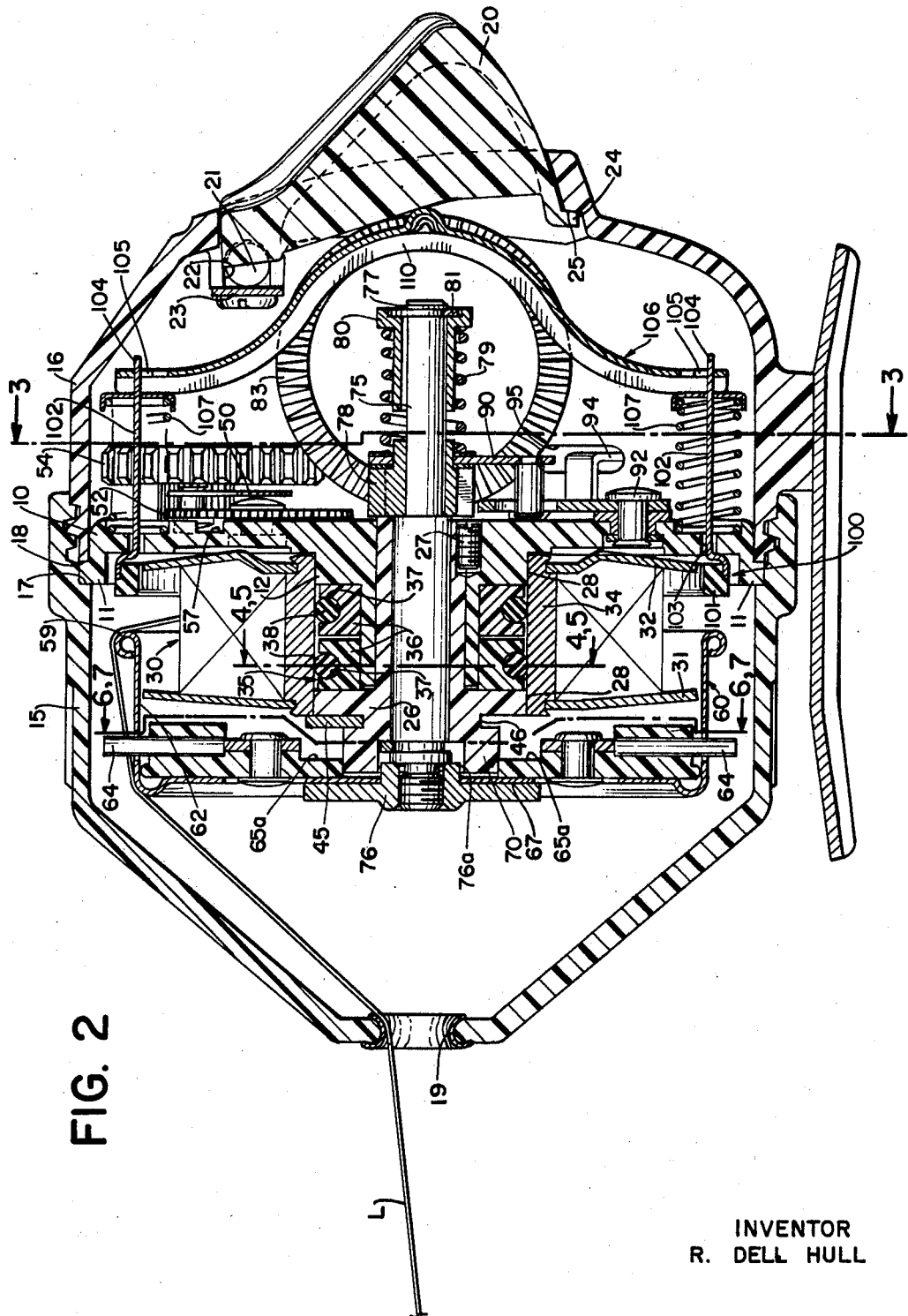

Dec. 2, 1969   R. D. HULL   3,481,554
SPINNING REEL
Filed Nov. 3, 1966   5 Sheets-Sheet 3
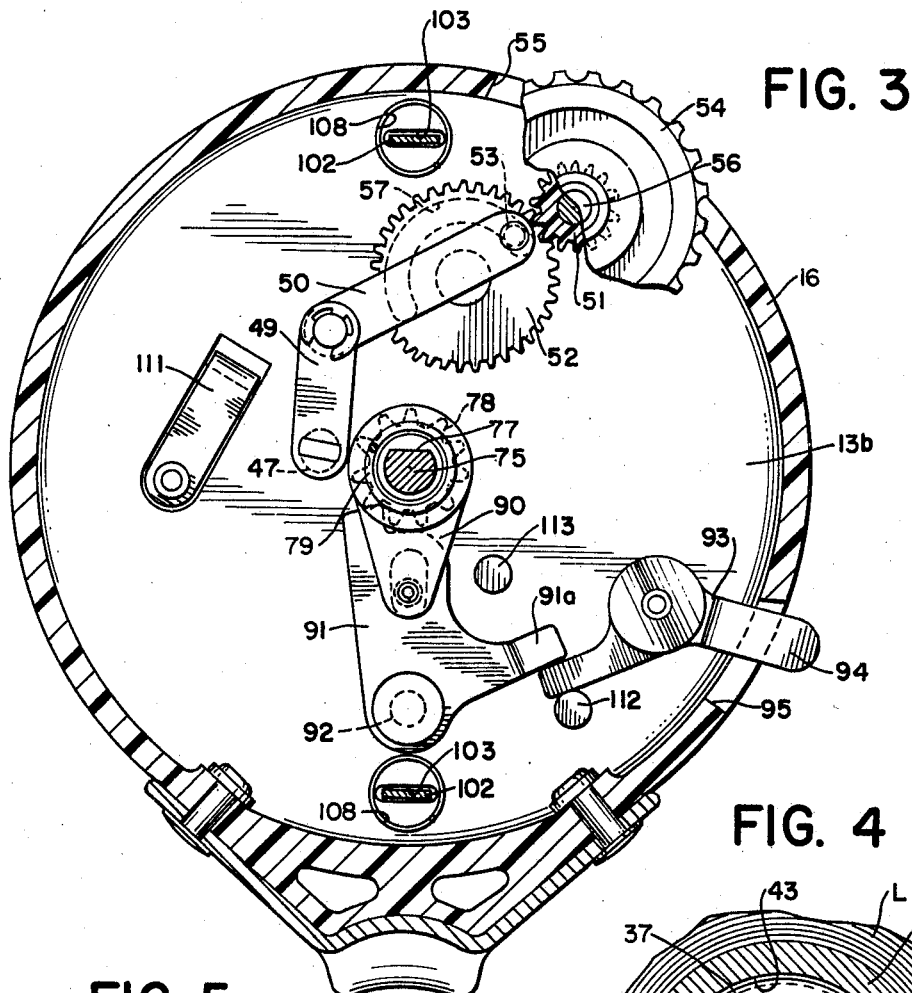
FIG. 3
FIG. 4
FIG. 5
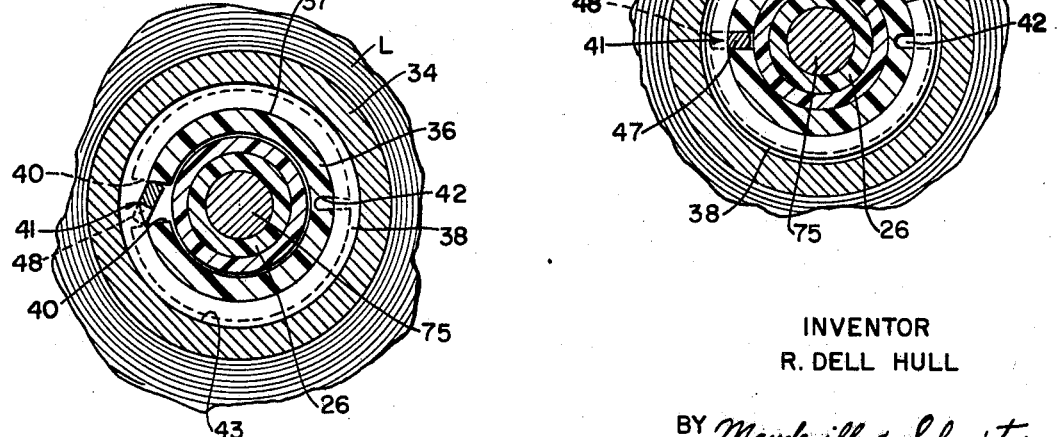
INVENTOR
R. DELL HULL
BY *Mandeville & Schweitzer*
ATTORNEYS Dec. 2, 1969  R. D. HULL  3,481,554
SPINNING REEL Filed Nov. 3, 1966  5 Sheets-Sheet 4

INVENTOR
R. DELL HULL

BY Mandeville & Schweitzer
ATTORNEYS

Dec. 2, 1969  R. D. HULL  3,481,554
SPINNING REEL
Filed Nov. 3, 1966  5 Sheets-Sheet 5

INVENTOR
R. DELL HULL

BY *Mandeville & Schweitzer*
ATTORNEYS

United States Patent Office 3,481,554
Patented Dec. 2, 1969

3,481,554
SPINNING REEL
R. Dell Hull, 6101 E. Apache St., Tulsa, Okla. 74115
Filed Nov. 3, 1966, Ser. No. 591,877
Int. Cl. A01k *89/00*
U.S. Cl. 242—84.2                        6 Claims

ABSTRACT OF THE DISCLOSURE

The disclosure relates to a sequential line braking-pickup element retracting mechanism for spinning reel assemblies of the type including a reel frame, a normally non-rotatable axially fixed line spool mounted on a cylindrical support projecting forwardly from the frame, and a spinner head carrying a pickup element mounted on a longitudinal main shaft supported in the frame for rotation about and displacement along a predetermined axis. The new mechanism includes a forwardly facing circular brake mounted in spaced relation with the rearwardly facing edge of the spinner head and means for sequentially engaging the brake with the spinner head to first clamp a line therebetween and thereafter to forwardly displace the spinner head sufficiently to retract a spring biased pickup element associated therewith.

---

The present invention relates generally to fishing reels and more particularly to improvements in heavy duty, closed face spinning reels.

In one type of closed face spinning reel, a line carrying spool is normally non-rotatably mounted on a hub which projects forwardly from a reel frame. The line spool is axially fixed and normally non-rotatable; however, provision is made for limited rotary slippage or "drag" of the spool relative to the reel frame for controlled withdrawal of line from the spool. During casting, the line is drawn off and over the front face of the spool by the momentum of the lure and travels through a line guide in a cover generally surrounding the spool.

Retrieval of paid out fishing line may be effected in reels of this type by a spinner head mounted on a rotatable main shaft carried by the reel frame. Advantageously, the spinner head of the invention includes one or more selectively, radially projectable pickup pins carried at the periphery thereof. As is customary in spinner heads having projectable pickup pins, the reel mechanism includes a cam arrangement for accommodating projection or retraction of the pickup pins with respect to the periphery of the spinner head. Typically, the reel also includes a crank assembly to effect the necessary rotation of the main shaft to retrieve paid out line. Advantageously, a selectively actuable anti-reverse mechanism is also included in the reel to prohibit rotation of the retrieval mechanism in a line pay out direction.

As an important aspect of the present invention, a rearwardly disposed, thumb button-actuated line brake ring is arranged in a reel of the foregoing general description to snub the line against the rearmost edge of the spinner head preparatory to casting and also to displace the spinner head to a position in which the aforementioned pickup pins are retracted. This arrangement provides an advantageous sequential line braking-pickup pin retracting action in which the second action (pickup pin retraction) cannot possibly be effected until the first action (line braking) has been effected. In other words, a so-called "failsafe" operation of the reel may be obtained, in accordance with the principles of the present invention, by mounting the spinner head on an axially displaceable main shaft and utilizing the spinner head as a passive element for line braking and subsequently using the same element in an active sense to effect the withdrawal of the pickup means. It is to be understood, of course, that if the pickup pins are retracted before the line is braked during the preparation for the line casting operation, the weight of the lure will draw line off the spool making an efficient and proper cast quite difficult if not impossible.

As another important aspect of the invention, the new and improved spinning reel includes an adjustable drag brake mechanism including a plurality of clutch elements in the form of O-rings disposed in contact with the bore of the line spool and supported by resilient clutch ring retainers mounted within the hub. In accordance with the invention, each clutch ring retainer is split and a cam actuator is disposed in the split between opposite faces thereof. The cam actuator is arranged, upon rotation, to increase and decrease, respectively, the effective outer diameter of the retainers and the O-rings carried thereon, increasing and decreasing the frictional drag force applied to the spool.

For a more complete understanding of the invention and its attendant advantages, reference should be made to the following detailed description taken in conjunction with the accompanying drawings, in which:

FIG. 1 is an exploded, perspective view of a new and improved fishing reel embodying the principles of the invention;

FIG. 2 is an enlarged, cross-sectional view of the new and improved fishing reel;

FIGS. 3–7 are cross-sectional views of the new reel taken along lines 3—3 through 7—7, respectively, of FIG. 2;

Figure 6:
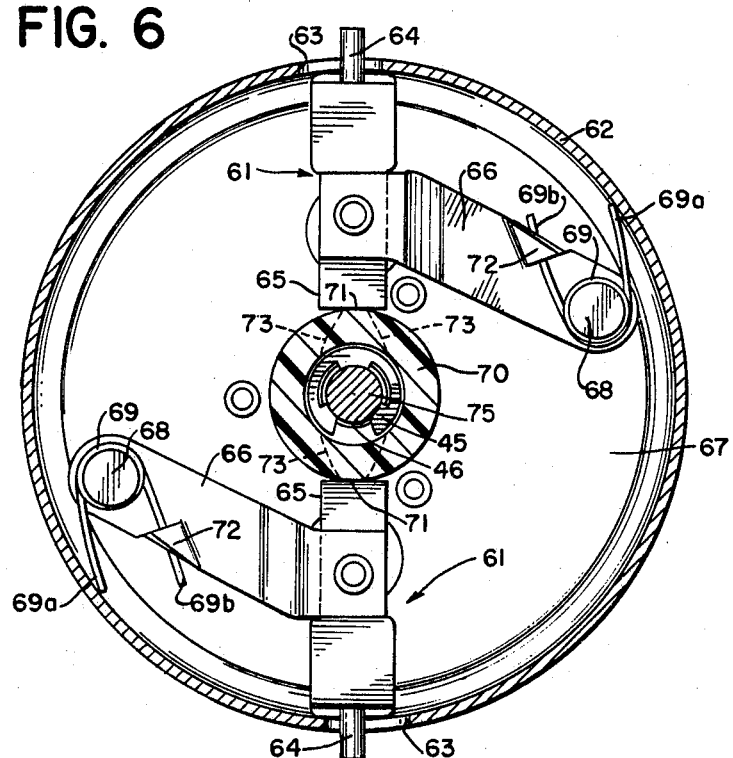

Referring to FIGS. 1 to 3, the new and improved fishing reel includes a cylindrical reel frame body 10 having a cylindrical hub 12 extending forwardly from its front face 13a and a boss 14 extending rearwardly from the back face 13b. The reel frame includes an annular peripheral flange 11 which is adapted to be clamped between threaded front and rear generally cup-shaped cover members 15 and 16, respectively. As shown in FIG. 2, an annular end surface 17 of the front cover member and an annular end surface 18 of the rear cover member engage the opposite faces of the flange 11 to complete the reel assembly in the manner claimed and set forth in detailed in United States Patent No. 3,105,651, issued to R. Dell Hull.

In reels of this general type, the front cover 15 includes a line guide 19 through which line L may be passed during casting and retrieving operations. The rear cover member 16 includes a thumb button 20 having integral transversely extending lugs 21, which are retained in sockets 22 formed integrally with the rear cover 16. A bar 23 extending across the socket 22 completes the assembly of the thumb button to the reel cover. The thumb button includes a depending lip 24 which is engagable with a shoulder 25 of the cover member 16 to limit rearward displacement of the thumb button, as shown clearly in FIG. 2.

In accordance with the invention, a forwardly projecting center bearing 26 is fixed to the reel frame 10 by a lock screw 27. A flange is included in the bearing 26 which, along with the cylindrical hub projection 12, provides spaced annular line spool supporting surfaces 28. A line spool 30 having front and back radial flanges 31, 32, respectively, and an arbor 34, is adapted to be seated on the surfaces 28 in a normally non-rotatable, axially fixed manner to be described hereinafter.

As shown best in FIG. 2, the hub and center bearing elements 12, 26 also cooperate in defining an annular groove 35 in which two expandable clutch retainer rings 36 are disposed. Each of the retainer rings 36 comprises a "closed C-shaped" member having a support groove 37 formed in its peripheral portions, which groove carries an O-ring clutch element 38 made of resilient, flexible material having a relatively high coefficient of friction, such as rubber. The retainer ring 36 includes opposed, spaced free edge portions 40 which define an actuating slot 41 (see FIGS. 4 and 5). As shown in the drawings, the slot 41 extends radially through the retaining ring 36 and provides it with its C-shaped appearance. To provide the retainer rings with an advantageous degree of flexion for the purposes of the invention, each is weakened in areas diametrically opposed to the actuating slot 41 by the formation of a slit 42. As will be appreciated, the slit 42 extends radially inwardly from the periphery of the retaining ring and accommodates spreading apart of the edges 40 to effectively increase the outer diameter of the retaining ring and the O-ring carried thereon.

The axially spaced O-ring elements 38 are adapted to bear against spaced inner surface areas 43 of the normally nonrotatable spool arbor 34 with varying degrees of force to accommodate limited, controlled rotation of the spool about the hub surfaces 28. The spool is axially fixed with respect to the front face 13a of the reel frame by a spring clip 45 which is snapped into an annular retaining groove 46 formed in the hub extension 26. As shown best in FIG. 2, the clip 45 bears against the spool arbor 34 to hold it securely and axially immovably against the reel frame 10.

In accordance with the invention, the O-ring clutch elements 38 are expanded through a clutch shaft 47 which extends axially through the reel frame and into the actuating slots 41 of the retainer rings 36. The actuating member includes an effectively eccentric portion 48 (with respect to actuating slot 41) having an oblong cross section. As will be understood, when the long sides of the eccentric portion 48 are aligned parallel to edges 40 of the retainer ring, as shown in FIG. 4, the retainer ring will be in its non-expanded position. However, as the eccentric portion is rotated, it will tend to increase gradually the gap between the opposed surfaces 40, as shown in FIG. 5. This, of course, expands the retainer rings 36 and the O-ring elements carried thereon and increases the "drag" or the resistance to slippage of the spool arbor 34 about the hub surfaces 28.

The use of multiple clutch elements 38 is especially important in heavy duty reels where a large degree and wide range of drag braking capacity is required. A drag brake arrangement utilizing a single clutch element and suitable for light duty reels is described in detail in copending application Ser. No. 557,752 of R. Dell Hull, filed June 15, 1966, for "Spinning Reel."

In accordance with the invention, control of the actuator 47 is effected through an articulated linkage 49, 50 which is controlled through a pinion 51 and gear 52. As shown best in FIG. 3, the link 50 is attached to the gear 52 through a stud 53 about which it may pivot as the gear 52 is rotated. The pinion 51 itself is integral with a rotatable thumb wheel 54 which is disposed in an opening 55 formed in the rear cover.

The combination thumb wheel-pinion is mounted at the rear face 13b of the reel frame by means of a stud 56. Advantageously, the gear 52 is mounted flush with the rear surface of the reel frame, by disposing the inner end of the stud 53 in a semi-circular recess 57. In accordance with the principles of the invention, the above-described drag brake actuating arrangement provides sufficient mechanical advantage to enable the multiple O-rings 38 to be easily expanded and allows such expansion to be precisely adjusted.

The new reel includes a cylindrical, cup-shaped spinner head 60 screwed onto the threaded end of the main shaft 75, through a lock nut element 76 riveted to the transverse wall 67. As shown in FIG. 6, the spinner head 60 includes a rearwardly extending annular flange 62 having diametrically opposed slots 63 formed therein and a thick bead 59 formed at the free edge thereof. The pickup elements 61 comprise pickup pins 64 carried in molded cam follower portions 65. Each of the molded portions is riveted to a support arm 66 pivotably mounted to the spinner head transverse wall 67 by a rearwardly projecting stud 68.

As shown, a closely wound torsion spring 69 is supported on the stud 68 with one free end 69a bearing against the inner surfaces of the flange 62, and its other free end 69b acting against an ear 72 formed on the support arm 66. Since there is a natural tendency of the spring ends to diverge, the spring provides a constant biasing of the arm 66 in the radially inward direction.

Figure 7:
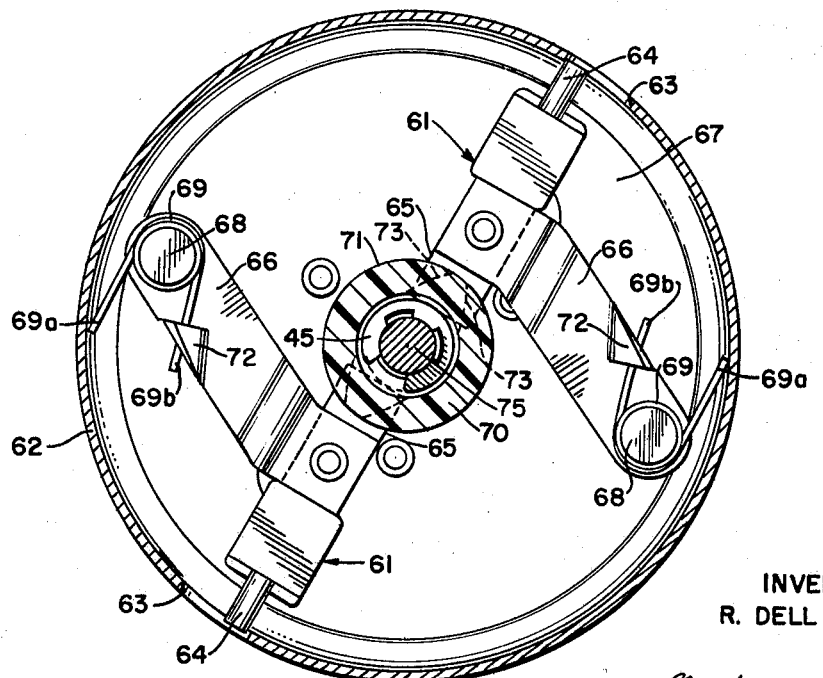

The molded cam follower portion 65 of the pickup elements are adapted to engage a cam 70 (see FIG. 1) formed on the outer end of the center bearing element 26. As shown in FIGS. 6 and 7, the cam 70 has high portions 71 and intermediate portions 73. When the follower portions 65 of the pickup elements are unrestrained by the cam 70, pickup pins 64 will be withdrawn to positions within the peripheral confines of the spinner head (FIG. 7) by the spring biased arms 66. However, when the follower portion 65 engages the high cam surface 71, the pickup pins 64 will be projected through the periphery of the spinner head into an active line retrieval position (FIG. 6).

In accordance with an important aspect of the invention, the main shaft 75 is supported in the center bearing 26 for both rotation and limited axial displacement. Specifically, the shaft 75 is stepped and its smaller diameter rear portions are provided with a flat 77, to which a spur gear 78 is slidably keyed. The main shaft 75 is provided with a constant rearward bias by a compression spring 79 which acts between the rear face of the gear 78 and a flanged spacer element 80 which itself bears against a spring clip 81 secured to the rearmost portion of the center shaft 75.

Rotary motion for line retrieval is imparted to the center shaft through rotation of a crank (not shown) attached to a crank shaft 82 which is mounted for rotation in the boss 14 of the reel frame. As shown best in FIG. 2, the crank shaft mounts a face gear 83 which meshes with the spur gear 78 to drive the main shaft 75.

Associated with the driving gear train of the reel in an anti-reverse mechanism comprising a pivotable anti-reverse actuator 90 maintained in frictional face-to-face contact with a rear surface of the spur gear 78 and an anti-reverse pawl element 91 supported at the back surface 13b of the reel frame by a rivet 92. Selective operation of the pawl 91 is effected through an anti-reverse control element 93 having a lever portion 94 projecting through a slot 95 formed in the rear cover.

When it is desired to prohibit reverse rotation of the retrieval mechanism, positioning of the control lever 94 in the "on" position against a post 112 will allow the anti-reverse element 91 to be driven through the actuator element 90 into blocking engagement with the gear 78. Of course, if the anti-reverse operation of the reel is not desired, the anti-reverse element 91 may be prevented from engaging the gear 78, i.e., it may be turned "off" by pivoting the lever 94 to its lower position in which the leg 91a of the element 91 is held against a post 113 to maintain the anti-reverse element in a non-blocking relation with the gear 78. Anti-reverse mechanisms of this general type are described in more detail and claimed in copending application Ser. No. 390,610 of R. Dell Hull for "Spinning Reel," filed Aug. 19, 1964.

In accordance with a further important aspect of the invention, a line brake ring retainer 100 carrying a brake ring 101 of rubber or a similar material having a high coefficient of friction is supported by spaced legs 102 extending through slots 103 in the reel frame. The rearmost portions of the legs 102 of the brake ring retainer have generally T-shaped locking portions 104 formed thereon which portions are insertable through and locked in T-shaped openings 105 formed in a brake actuating bar 106. In accordance with the invention, the brake ring is given rearward bias by compression springs 107 which surround the legs 102 and act between circular recesses 108, formed in the back face of the reel frame, and annular washers 109.

Figure 8:
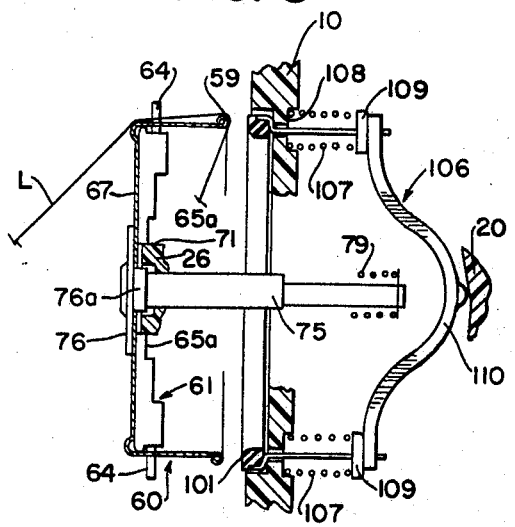
FIG. 8 is a schematic view of the sequential line braking-pickup pin retracting mechanism of the invention in its initial position, before depression of the thumb button control element.

As will be understood, the legs 102 are assembled to the brake actuating bar 106 by inserting the T-shaped portions 104 thereof through the T-shaped openings 105 and thereafter aligning the throats of the T-shaped openings with the throats of the T-shaped portions 104. As shown in FIGS. 2 and 8, the completed brake ring assembly will be urged rearwardly of the reel by the springs 107. An arcuate central portion 110 of the actuating bar 106 will be in contact with the thumb button 20 and will normally urge the thumb button to its rearwardmost position as determined by the engagement of the lip 25 of the button and the shoulder 24 of the rear cover element.

The new and improved reel is prepared for casting by depressing the thumb button 20, which operation, in accordance with the principles of the invention, will initially, forwardly displace the brake ring 101 against the bead 59 of the spinner head 60 to securely clamp the line therebetween. Continued depression of the thumb button will cause the spinner head to be forwardly displaced by and in unison with the brake ring until the follower portions 65 of the pickup pin elements drop off the high cam surfaces 71 and onto a hub portion 76a of the lock nut 76 under the influence of springs 69 to retract the pickup pins 64. This sequential operation of braking the line and thereafter retracting the pickup pins 64 is a particularly important aspect of the present invention, and as should be understood, reliably prevents any pay out of line under the influence of the weight of the lure while the reel is being prepared for casting.

Figure 10:
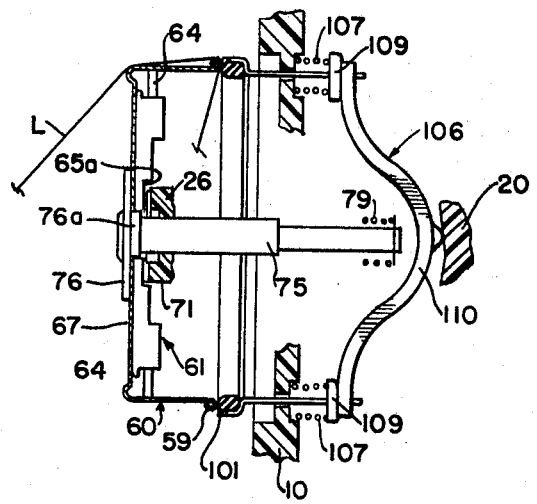
FIG. 10 is a schematic view of the mechanism of FIG. 8 positioned with the brake ring displacing the spinner head to retract the pickup pins in accordance with the inventive principles.

As the reel is swung forward on the fishing pole, thumb pressure is maintained on the button 20 to keep the line braked until the instant that pay out is desired. Release of thumb pressure will cause the brake ring 101 to be automatically withdrawn from the bead 59 under the influence of the compression springs 107. While the line is being drawn off the spool under the forward momentum of the cast lure, the spinner head and the main shaft will be locked in a forwardmost position by the engagement of the side edges 65a of the follower portions with the forwardmost edges of the center bearing 26, as shown schematically in FIG. 10.

Figure 9:
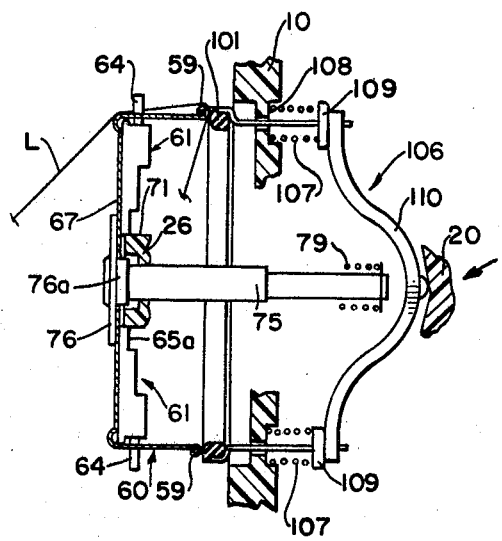
FIG. 9 is a schematic view of the mechanism of FIG. 8 positioned with the line brake ring initially engaging the spinner head.

Retrieval of the line is effected simply and efficiently by rotating the main shaft 75 through the aforementioned crank, face gear and spur gear arrangement. At the initiation of rotation, the bases of the follower portions 65 of the molded elements will engage the intermediate portions 73 of the cam 70 and will be guided therealong to the high portions 71 of the cam under the combined influence of the rotation of the main shaft 75 and the rearward displacement thereof caused by the bias of the spring 79. Continued rotation of the spinner head with its pickup pins 64 in the projected position in FIGS. 2, 8 and 9 will cause the line to be engaged by one of the pickup pins and wound about the spool 30 to complete the retrieval operation.

During line retrieval or while the line is payed out, excessive forces may be exerted on the line by a hooked fish, a snagged object, or the like. As should be appreciated, the O-ring clutch elements 38 accommodate limited, controlled slippage or rotation of the spool 30 about the hub surfaces 28, and concomitant line pay out, to prevent the excessive load from breaking or unduly straining the line as would otherwise be the case. As an important aspect of the present invention, the "drag" of the spool is easily and rapidly adjusted through the rotatable thumb wheel 54, pinion 51, and linkage 49, 50, to increase or to decrease the diameter of the clutch retainers 36 and the O-rings 38 and hence the resistance to slippage of the spool arbor 34. Furthermore, it will be understood that the use of the relatively soft O-rings in the clutch mechanism accommodates wider manufacturing tolerances without comprising the operation of the reel. Advantageously, an alarm is sounded upon rotation of the spool, by the cooperation of a spring pawl 111 and serrations on the rear flange 32 of the spool when it slips about the hub surfaces 28.

It should be understood that the specific spinning reel structure herein illustrated and described is intended to be representative only, as certain changes may be made therein without departing from the clear teachings of the disclosure. According, reference should be made to the following appended claims in determining the full scope of the invention.

What is claimed is:

1. In a spinning reel assembly comprising a reel frame, a normally non-rotatable, axially fixed line spool mounted on a cylindrical support projecting forwardly from said frame, and a spinner head carrying a pickup element mounted on a longitudinal main shaft supported in said frame for rotation about and displacement along a predetermined axis, a sequential line braking-pickup element retracting mechanism characterized in that
   (a) said spinner head includes a rearwardly facing circular bead element of a predetermined diameter;
   (b) said mechanism includes a forwardly facing circular line brake ring of a diameter similar to that of said bead;
   (c) said reel includes means mounting said brake ring in spaced relation with said bead element and accommodating axial displacement of said ring relative to said spinner head;
   (d) said reel frame includes means mounting said shaft for limited axial displaceemnt relative thereto;
   (e) a first spring means urges said line brake rearwardy of said reel;
   (f) means biasing said pickup element toward an inactive position when said main shaft is in a forward position projecting said pickup element into an active position when said shaft is in a rearward position;
   (g) a second spring means urges said shaft rearwardly of said reel toward said rearward position;
   (h) manually operable means for displacing said line brake ring to sequentially cause said brake ring to engage circumferentially said bead and to displace said spinner head and shaft from said rearward to said forward position to effect a retraction of said pickup element into an inactive position.

2. The reel of claim 1, in which
   (a) said brake ring includes an annular retaining element having at least one rearwardly extending leg means;
   (b) said brake ring mounting means includes slot means in the reel frame in which said leg means is supported.

3. A reel in accordance with claim 2, in which
   (a) said leg means comprises two legs extending from diametrically opposed portions of said brake ring;
   (b) an actuating bar connects said two legs;
   (c) said first spring means includes compression springs acting between said reel frame and said actuating bar, thereby urging said connected brake ring and actuating bar rearwardly of said frame.

4. A reel in accordance with claim 3, in which
   (a) said manually operable means includes a thumb button means associated with said actuating bar to selectively displace said bar and said brake ring forwardly of said reel frame.

5. A reel in accordance with claim 2, in which
(a) the surface of said brake ring which is adapted to engage said spinner head comprises a material having a high coefficient of friction.

6. A sequential line braking-pickup element retracting mechanism for a spinning reel comprising
(a) a reel frame means;
(b) a line spool maintained in axially fixed relation to said reel frame;
(c) a shaft supported for limited axial movement in said reel frame;
(d) first spring means urging said shaft rearwardly of said frame;
(e) a spinner head including a line pickup element projectable from an operative to inoperative position mounted on said shaft;
(f) cam means associated with said reel frame means and cooperable with said pickup element to control the position of said pickup element in accordance with the axial position of said spinner head;
(g) said spinner head having a rearwardly facing annular edge;
(h) line brake ring means having a diameter similar to that of said edge;
(i) means supporting said line brake ring means in predetermined spaced relation to said annular edge and mounting said brake ring for displacement axially of said reel frame means;
(j) means for moving said line brake ring means axially forward to engage sequentially said rearwardly facing edge to clamp a line therebetween and to displace said spinner head axially forwardly to change the position of said spinner head with respect to said cam means to move said pickup element into an inoperative position; and
(k) second spring means urging said line brake ring means rearwardly of said frame.

References Cited
UNITED STATES PATENTS

| | | |
|---|---|---|
| 3,296,731 | 1/1967 | Wood. |
| 2,602,603 | 7/1952 | Blissit. |
| 2,668,025 | 2/1954 | Hull. |
| 2,915,258 | 12/1959 | Hull. |
| 3,116,893 | 1/1964 | Wood. |
| 3,123,318 | 3/1964 | Wood. |
| 3,223,347 | 12/1965 | Clark. |
| 3,284,018 | 11/1966 | Wood. |

FOREIGN PATENTS 632,322  1/1962  Italy.

BILLY S. TAYLOR, Primary Examiner

U.S. Cl. X.R.

242—84.51